United States Patent
Howell et al.

[15] 3,668,927
[45] June 13, 1972

[54] BOREHOLE THERMAL CONDUCTIVITY MEASUREMENTS

[72] Inventors: Eddie P. Howell, Plano; Carl A. Youngman, Dallas; Jack E. Hardison, Garland, all of Tex.; Robert E. Tribble, Princeton, N.J.

[73] Assignee: Atlantic Richfield Company, New York, N.Y.

[22] Filed: Oct. 16, 1970

[21] Appl. No.: 81,224

[52] U.S. Cl. ............................................. 73/154
[51] Int. Cl. ....................................... E21b 47/06
[58] Field of Search ............... 73/154, 15, 340, 341, 342; 166/64

[56] References Cited

UNITED STATES PATENTS

| | | | |
|---|---|---|---|
| 2,414,862 | 1/1947 | Fearon | 73/341 UX |
| 2,843,459 | 7/1958 | Meiklejohn | 73/154 X |

Primary Examiner—Jerry W. Myracle
Attorney—Blucher S. Tharp and Robert E. Lee, Jr.

[57] ABSTRACT

A system for making thermal conductivity measurements in dry boreholes. A probe having a temperature sensor, a heater, and expander means is inserted into a borehole. The expander means is actuated so that the temperature sensor contacts the sidewall. The heater then heats the sensor and temperature measurements are made at predetermined intervals to obtain a heating curve. The slope of the plot for temperature versus logarithmic time is linear and proportional to the conductivity.

4 Claims, 4 Drawing Figures

INVENTORS
Eddie P. Howell
Carl A. Youngman
Jack E. Hardison
Robert E. Tribble

BY Robert Elsworth Lee

ATTORNEY

INVENTORS
Eddie P. Howell
Carl A. Youngman
Jack E. Hardison
Robert E. Tribble

BY Robert Elsworth Lee

ATTORNEY

3,668,927

BOREHOLE THERMAL CONDUCTIVITY MEASUREMENTS

BACKGROUND OF THE INVENTION

The present invention relates to processes and apparatus for making borehole temperature measurements and particularly pertains to making thermal conductivity measurements.

The state of the art for in situ thermal conductivity measurements is restricted to ocean sediments and wet boreholes. The method of measurement used in such instances is a line source with radial flow; however, this would not be a practical procedure for making measurements in dry boreholes. No literature is known by applicants pertaining to ways and means for making thermal conductivity measurements of formations traversed by dry boreholes.

It is an object of the present invention to provide a suitable method and borehole probe for measuring conductivity that will give reproducible and highly accurate results. Another object is to provide a borehole probe having a temperature sensor and heater. Another object is to provide expander means for causing the temperature sensor to contact the sidewall of the borehole at a given location. Another object is to provide means for pneumatically actuating the expander means. Another object is to weatherproof the probe to protect the temperature sensor from ground water in the borehole.

SUMMARY OF THE INVENTION

According to the present invention, a borehole probe is constructed having a temperature measuring means and heating means. The probe is also provided with expander means that can be actuated from the surface to position the temperature measuring means against the sidewall of the borehole.

In making conductivity measurements, the probe is lowered into a borehole and the expander means is actuated so that the temperature measuring means contacts a predetermined subsurface location. The heating means is then turned on and sufficient temperature versus time measurements are made to obtain a heating curve. The rate that the temperature of the temperature means increases with time is proportional to the conductivity of the earth formation in contact with the probe.

DESCRIPTION OF THE PREFERRED EMBODIMENT(S)

The mathematics of heat flow has been handled by Carslaw and Jaeger in *Conduction of Heat in Solids*, Oxford, Clarendon Press, 1959.

The general equation is $$\nabla^2 V = \frac{1}{k} \frac{\partial V}{\partial t}$$

where $V$ is temperature (°C); $t$ is time (sec.); $k$ is thermal conductivity (cal./cm sec° C); and is the Laplacian operator. By solving the equation, it can be shown that the slope of the temperature versus the logarithm of time ($V$ vs. ln $t$) curve is a straight line proportional to conductivity $k$.

Using this method, Kerstein has tabulated the thermal conductivities for soils and sands having various moisture contents and densities. M. S. Kerstein, "Thermal Properties of Soils," University of Minnesota, Institute of Technology, Bulletin No. 28, 1949.

Figure 1:
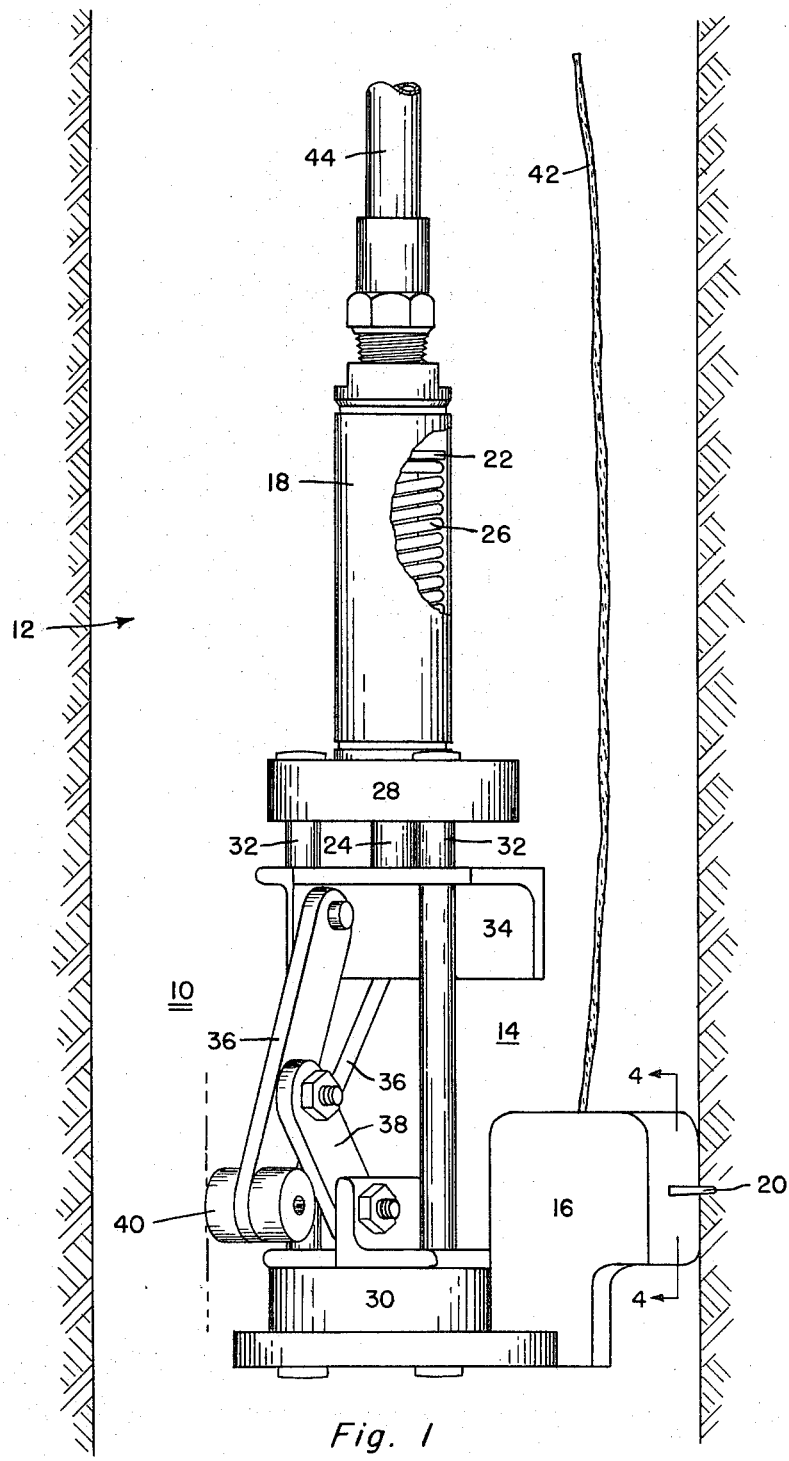
FIG. 1 is a schematic view of a borehole containing conductivity measuring apparatus according to the invention.
Figure 2:
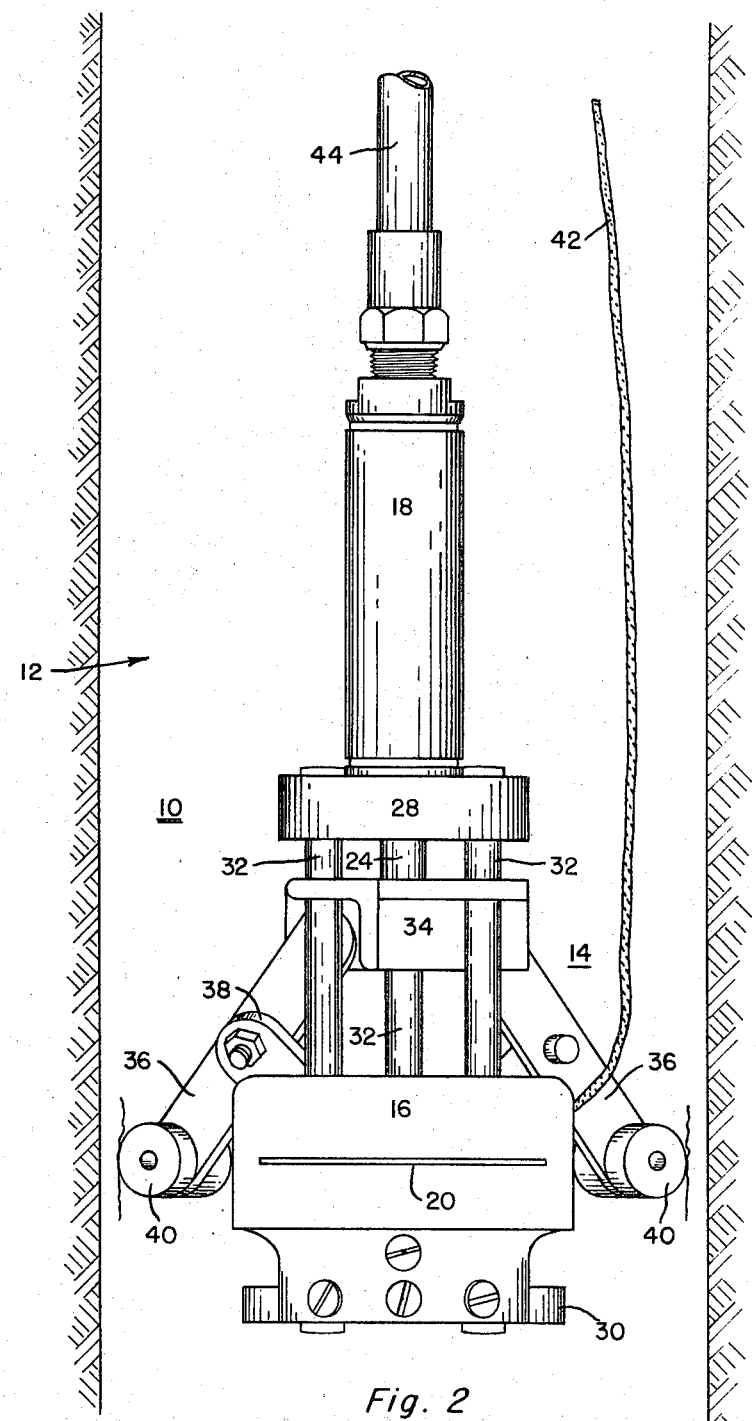
FIG. 2 is a schematic view similar to FIG. 1 showing the conductivity measuring apparatus rotated 90° in a clockwise direction.

Referring to FIGS. 1 and 2, apparatus is shown for making conductivity measurements according to the present invention. Probe 10 is positioned in borehole 12 and has frame member 14 mounting sensor housing 16 and air cylinder 18. Sensing element 20 protrudes laterally from sensor housing 16. Cylinder 18 has piston 22 driving rod 24 against the action of spring 26. Frame member 14 has upper section 28 and lower section 30 separated by rods 32. Platform 34 is slidable up and down rods 32 between sections 28 and 30. Rod 24 connects platform 34 with piston 22. Expander arms 36 are pivotably attached to platform 34. Connecting links 38 connect arms 28 to bottom section 30 and urge arms 28 in an outer direction as platform 34 is moved downward. When arms 36 are extended, rollers 40 contact the sidewalls of borehole 12, pushing probe 10 sideways. Expander arms 36 are designed so that they exert their pressure perpendicular to the sidewall of borehole 12. This causes sensing element 20 to be pushed straight into the sidewall of borehole 12. Electrical connection to uphole recording and measuring instruments is made via cable 42. Hose 44 connects cylinder 18 to a source of pressurized air (not shown) on the surface. Hose 44 also serves as means for lowering and raising probe 10 in borehole 12.

Figure 3:
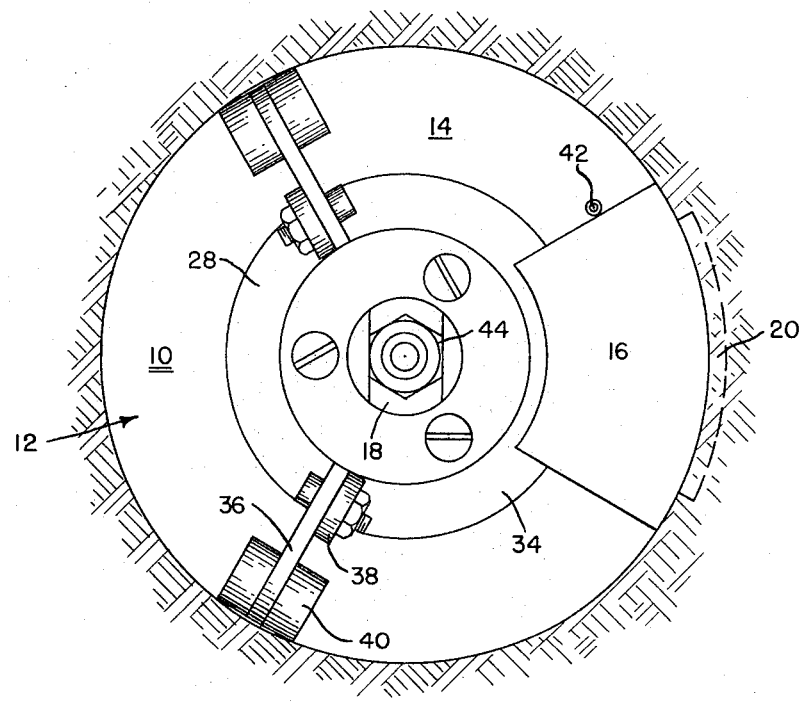
FIG. 3 is a schematic view of the conductivity measuring apparatus looking down the borehole.

Referring to FIG. 3, probe 10 is shown looking down from the top of borehole 12. It will be seen that expander arms 36 are radially disposed at 120° angles from each other and sensor housing 16. Sensing element 20 has a wide contact area in order to minimize the effects of formation irregularities. The outer arc of sensor housing 16 is curved to conform to the curvature of the borehole being surveyed.

Figure 4:
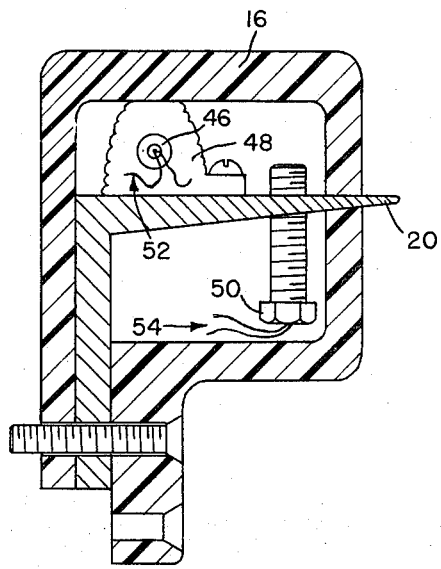
FIG. 4 is an enlarged cross-sectional view of the temperature sensor housing taken along 4—4 of FIG. 1.

Referring to FIG. 4, a cross-sectional view of sensor housing 16 is shown. Inside housing 16, resistor 46 is mounted in heater base 48 on one side of sensing element 20 and thermistor 50 is mounted on the other side. Sensing element 20 is constructed of a good heat conducting material, e.g., aluminum. Electrical leads 52 and 54 are carried by cable 42 (FIGS. 1 and 2) to uphole equipment. Electrical energy supplied via leads 52 heats sensing element 20. Resistance measurements are made with respect to thermistor 50 by means of leads 54. Housing 16 is plastic and forms a waterproof thermally insulating barrier protecting thermistor 50 and all but one-eighth inch of the outer contact edge of sensing element 20.

In operation, probe 10 is lowered into borehole 12 by means of hose 44 until the desired depth is reached. Probe 10 is then properly oriented in the well and air cylinder 18 is pressurized. This can be done simply by connecting a hand-operated air pump or a can of refrigerant to hose 44. If a compressor is available, it can, of course, be employed. When cylinder 18 is sufficiently pressurized, rod 24 drives platform 34 downward, forcing expander arms 36 in an outward direction. This drives sensing element 20 into the sidewall of borehole 12 for a depth determined by housing 16. Electrical energy is then supplied at a constant rate to resistor 46. This heats base 48 and sensing element 20. Temperature measurements are made of sensing element 20 at predetermined time intervals by making resistivity measurements with thermistor 50. After enough data points have been plotted to obtain a heating curve, cylinder 18 is de-pressurized. Spring 26 then returns piston 22 to its upward position causing rod 24 to retract arms 36. Probe 10 can now be removed or relocated at a different position in borehole 12.

In field testing the invention, a constant voltage source was used for the power supply. A Technipower D.C.—D.C. converter (Model No. CKP 6.0–4.0) with a nickel cadmium 12 volt battery gave a constant 6.03 ± 0.02 volt output. A Simpson voltmeter (0–10 volts) was used to monitor the power supply output. A 25 ohm, 5 watt, 1 percent precision resistor was used as the heating element. The power supply with the 25 ohm resistor furnished 0.46 watts of power to the heater base. A Yellow Springs Instruments thermistor with a repeatable accuracy of 0.005° C was used for making temperature measurements. Data was taken from a Fluke four-place digital ohmmeter. A stopwatch was used for a timer and resistance values were recorded every 10 seconds for 5 minutes. Typically, the slope of the heating curves obtained with respect to the soils tested by applicants were 0.085 to 0.017 cal/cm. sec° C.

According to the mathematics of radial heat flow, both heating curves and cooling curves should approximate a linear plot for temperature vs. ln time, after a period of time. It follows that the apparatus employed by applicants can also be used to measure cooling curves to order to calculate thermal conductivity. The procedure is to heat the sensing element to a predetermined temperature and then make temperature readings as the sensing element cools.

What is claimed is:

1. Apparatus for measuring thermal conductivity in a borehole comprising a borehole probe having a frame member with laterally expandable arms, a sensor housing attached to said frame member on the side opposite to said arms, and an air cylinder mounted on said frame member driving a rod which operates said expandable arms, said sensor housing including a sensing element designed to contact the sidewall of the borehole, a thermistor for measuring the temperature of said sensing element, and heating means for heating said sensing element.

2. Apparatus according to claim 1 where there are two expandable arms radially disposed at 120° angles from each other and said sensor housing.

3. Apparatus for measuring thermal conductivity in a borehole comprising a borehole probe having temperature measuring means, an electrical heating element connected to said temperature measuring means, said heating element being adapted to heat said temperature measuring means to a predetermined temperature, and horizontal-acting expander means, said expander means being adapted to contact the sidewall of the borehole and hold the probe in a fixed location.

4. Apparatus according to claim 3 where said expander means is pneumatically actuated.

* * * * *